US012169689B2

(12) United States Patent
Baek et al.

(10) Patent No.: US 12,169,689 B2
(45) Date of Patent: Dec. 17, 2024

(54) CRIME TYPE INFERENCE SYSTEM AND METHOD BASED ON TEXT DATA

(71) Applicant: ELECTRONICS AND TELECOMMUNICATIONS RESEARCH INSTITUTE, Daejeon (KR)

(72) Inventors: Myung Sun Baek, Daejeon (KR); Seung Hee Kim, Daejeon (KR); Young Soo Park, Daejeon (KR); Won Joo Park, Daejeon (KR); Sang Yun Lee, Daejeon (KR); Yong Tae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 240 days.

(21) Appl. No.: 17/752,611

(22) Filed: May 24, 2022

(65) Prior Publication Data
US 2022/0382974 A1 Dec. 1, 2022

(30) Foreign Application Priority Data

May 27, 2021 (KR) .................. 10-2021-0068365
Apr. 21, 2022 (KR) .................. 10-2022-0049513

(51) Int. Cl.
*G06F 40/242* (2020.01)
*G06F 16/35* (2019.01)
(Continued)

(52) U.S. Cl.
CPC ............ *G06F 40/242* (2020.01); *G06F 16/35* (2019.01); *G06F 40/268* (2020.01); *G06F 40/279* (2020.01); *G06Q 50/265* (2013.01)

(58) Field of Classification Search
CPC .............. A63F 13/63; G06F 16/2462; G06F 16/24564; G06F 16/24565; G06F 16/285; G06F 16/313; G06F 16/35; G06F 16/907; G06F 16/951; G06F 18/214; G06F 40/20; G06F 40/216; G06F 40/242; G06F 40/268; G06F 40/274; G06F 40/279;
(Continued)

(56) References Cited

U.S. PATENT DOCUMENTS 8,487,773 B2    7/2013  Kang et al.
11,727,208 B2 *  8/2023  Riskin ................. G06F 40/40
                                                    704/9
(Continued)

FOREIGN PATENT DOCUMENTS

KR    10-1714697 B1    3/2017
KR    10-2010948 B1    8/2019

*Primary Examiner* — Gerald Gauthier
(74) *Attorney, Agent, or Firm* — Rabin & Berdo, P.C.

(57) ABSTRACT

A crime type inference system based on text data, may include: a keywords dictionary construction unit configured to receive crime source data, and generate a crime type keywords dictionary by extracting crime keywords; a data set construction unit configured to generate a dataset for crime type learning by using the crime source data and the keywords dictionary; a crime type prediction model training unit configured to generate a crime type prediction model by using the dataset, and train the crime type prediction model; and a crime type inference unit configured to infer a crime type by using new crime data.

17 Claims, 8 Drawing Sheets

(51) Int. Cl.
  *G06F 40/268*   (2020.01)
  *G06F 40/279*   (2020.01)
  *G06Q 50/26*    (2012.01)

(58) Field of Classification Search
  CPC ...... G06F 40/284; G06F 40/30; G06F 16/345;
        G06F 16/355; G06F 40/205; G06F 40/35;
        G06F 40/40; G06N 7/01; G06N 20/20;
        G06N 3/008; G06N 3/044; G06N 3/045;
        G06Q 10/10; G06Q 40/00; G06Q 50/265;
        H04L 51/046; H04M 3/2281; H04N
        21/23418
  See application file for complete search history.

(56) References Cited

U.S. PATENT DOCUMENTS

| | | | | |
|---|---|---|---|---|
| 11,755,834 | B2* | 9/2023 | Lambert | G06F 40/284 704/9 |
| 11,755,841 | B2* | 9/2023 | Crudele | G06F 40/30 704/9 |
| 11,763,091 | B2* | 9/2023 | Thor | G06F 40/284 704/9 |
| 11,763,093 | B2* | 9/2023 | Beigi | G06N 3/045 704/9 |
| 11,775,772 | B2* | 10/2023 | Galitsky | G06F 40/35 704/9 |
| 11,783,130 | B2* | 10/2023 | Andreotti | G06F 16/345 704/9 |
| 11,790,177 | B1* | 10/2023 | Barrasso | H04M 3/2281 704/9 |
| 11,790,181 | B2* | 10/2023 | Guo | G06N 3/044 704/9 |
| 2008/0208801 | A1* | 8/2008 | Friedlander | G06F 16/907 |
| 2008/0208838 | A1* | 8/2008 | Friedlander | G06F 16/24565 707/999.005 |
| 2008/0208875 | A1* | 8/2008 | Friedlander | G06Q 10/10 |
| 2008/0208901 | A1* | 8/2008 | Friedlander | G06F 16/2462 707/999.102 |
| 2008/0208902 | A1* | 8/2008 | Friedlander | G06F 16/24564 |
| 2008/0278334 | A1* | 11/2008 | Friedlander | G06Q 10/10 707/999.005 |
| 2008/0288430 | A1* | 11/2008 | Friedlander | G06F 16/2462 706/46 |
| 2009/0300589 | A1* | 12/2009 | Watters | G06Q 40/00 717/140 |
| 2012/0030249 | A1* | 2/2012 | Schrag | A63F 13/63 707/E17.044 |
| 2014/0297494 | A1* | 10/2014 | Watters | G06Q 40/00 705/35 |
| 2016/0140858 | A1* | 5/2016 | Adderly | G06F 40/30 704/9 |
| 2016/0321563 | A1* | 11/2016 | Sinha | G06N 3/008 |
| 2017/0075991 | A1* | 3/2017 | Kataria | G06N 7/01 |
| 2019/0050473 | A1* | 2/2019 | Bhattacharya | G06F 16/285 |
| 2019/0057286 | A1* | 2/2019 | Woulfe | H04N 21/23418 |
| 2019/0180327 | A1* | 6/2019 | Balagopalan | G06F 16/951 |
| 2019/0318223 | A1* | 10/2019 | Xie | G06F 40/20 |
| 2020/0302015 | A1* | 9/2020 | Kannan | G06F 40/284 |
| 2020/0394361 | A1* | 12/2020 | Parikh | G06F 40/274 |
| 2021/0073256 | A1* | 3/2021 | Park | G06F 16/313 |
| 2022/0138591 | A1* | 5/2022 | Carbune | G06F 40/35 704/9 |
| 2022/0245514 | A1* | 8/2022 | Venkatasubramaniam | G06N 20/20 |
| 2022/0292427 | A1* | 9/2022 | Acuff | H04L 51/046 |
| 2022/0366141 | A1* | 11/2022 | Soon | G06F 18/214 |
| 2022/0382974 | A1* | 12/2022 | Baek | G06F 40/242 |
| 2023/0316230 | A1* | 10/2023 | Choi | G06F 40/205 704/9 |
| 2023/0325592 | A1* | 10/2023 | Yang | G06F 16/355 704/9 |

* cited by examiner

| ONE-HOT VECTOR | | | | | | | | | | | | | | | | | | | | CRIME TYPE |
|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | THEFT |
| 0 | 1 | 0 | 0 | 0 | 0 | 0 | 0 | 0 | 0 | 0 | 0 | 0 | 0 | 0 | 0 | 0 | 0 | 0 | 0 | ARREST CONFINEMENT |
| 0 | 0 | 1 | 0 | 0 | 0 | 0 | 0 | 0 | 0 | 0 | 0 | 0 | 0 | 0 | 0 | 0 | 0 | 0 | 0 | DESTRUCTION |
| 0 | 0 | 0 | 1 | 0 | 0 | 0 | 0 | 0 | 0 | 0 | 0 | 0 | 0 | 0 | 0 | 0 | 0 | 0 | 0 | THREAT |
| 0 | 0 | 0 | 0 | 1 | 0 | 0 | 0 | 0 | 0 | 0 | 0 | 0 | 0 | 0 | 0 | 0 | 0 | 0 | 0 | KIDNAPPING |
| 0 | 0 | 0 | 0 | 0 | 1 | 0 | 0 | 0 | 0 | 0 | 0 | 0 | 0 | 0 | 0 | 0 | 0 | 0 | 0 | INJURY |
| 0 | 0 | 0 | 0 | 0 | 0 | 1 | 0 | 0 | 0 | 0 | 0 | 0 | 0 | 0 | 0 | 0 | 0 | 0 | 0 | ASSAULT |
| 0 | 0 | 0 | 0 | 0 | 0 | 0 | 1 | 0 | 0 | 0 | 0 | 0 | 0 | 0 | 0 | 0 | 0 | 0 | 0 | THREAT |
| 0 | 0 | 0 | 0 | 0 | 0 | 0 | 0 | 1 | 0 | 0 | 0 | 0 | 0 | 0 | 0 | 0 | 0 | 0 | 0 | EMBEZZLEMENT |
| 0 | 0 | 0 | 0 | 0 | 0 | 0 | 0 | 0 | 1 | 0 | 0 | 0 | 0 | 0 | 0 | 0 | 0 | 0 | 0 | MALFEASANCE |
| 0 | 0 | 0 | 0 | 0 | 0 | 0 | 0 | 0 | 0 | 1 | 0 | 0 | 0 | 0 | 0 | 0 | 0 | 0 | 0 | FRAUD |
| 0 | 0 | 0 | 0 | 0 | 0 | 0 | 0 | 0 | 0 | 0 | 1 | 0 | 0 | 0 | 0 | 0 | 0 | 0 | 0 | SPECIFIC ECONOMIC CRIME |
| 0 | 0 | 0 | 0 | 0 | 0 | 0 | 0 | 0 | 0 | 0 | 0 | 1 | 0 | 0 | 0 | 0 | 0 | 0 | 0 | RAPE |
| 0 | 0 | 0 | 0 | 0 | 0 | 0 | 0 | 0 | 0 | 0 | 0 | 0 | 1 | 0 | 0 | 0 | 0 | 0 | 0 | ROBBERY |
| 0 | 0 | 0 | 0 | 0 | 0 | 0 | 0 | 0 | 0 | 0 | 0 | 0 | 0 | 1 | 0 | 0 | 0 | 0 | 0 | FORCED INDECENT ACT |
| 0 | 0 | 0 | 0 | 0 | 0 | 0 | 0 | 0 | 0 | 0 | 0 | 0 | 0 | 0 | 1 | 0 | 0 | 0 | 0 | MURDER |
| 0 | 0 | 0 | 0 | 0 | 0 | 0 | 0 | 0 | 0 | 0 | 0 | 0 | 0 | 0 | 0 | 1 | 0 | 0 | 0 | ARSON |
| 0 | 0 | 0 | 0 | 0 | 0 | 0 | 0 | 0 | 0 | 0 | 0 | 0 | 0 | 0 | 0 | 0 | 1 | 0 | 0 | SIMILAR RAPE |
| 0 | 0 | 0 | 0 | 0 | 0 | 0 | 0 | 0 | 0 | 0 | 0 | 0 | 0 | 0 | 0 | 0 | 0 | 1 | 0 | DRUG |
| 0 | 0 | 0 | 0 | 0 | 0 | 0 | 0 | 0 | 0 | 0 | 0 | 0 | 0 | 0 | 0 | 0 | 0 | 0 | 1 | GAMBLE |
| 0 | 0 | 0 | 0 | 0 | 0 | 0 | 0 | 0 | 0 | 0 | 0 | 0 | 0 | 0 | 0 | 0 | 0 | 0 | 1 | SEX CUSTOM CRIME |

| CRIME RISK PREDICTION SYSTEM |
|---|

410

| CASE TEXT | THE ACCUSED DRANK BEER WORTH KRW 159,000 AT A BAR RUN BY THE VICTIM NON-INDICTED PARTY 1 (FEMALE, 39 YEARS OLD) AROUND 01:50 ON MAY 27, 2019, THE ACCUSED PAID ONLY KRW 22,000 AFTER THE VICTIM NON-INDICTED PARTY 1 AND THE WAITER NON-INDICTED PARTY 2 (FEMALE, 25 YEARS OLD) REQUESTED THE ACCUSED TO PAY FOR DRINKING, AND THEN TRIED TO LEAVE THE BAR WITHOUT PAYING THE REST OF THE ALCOHOL. WHEN THE VICTIM NON-INDICTED PARTY 1 GRABBED THE ACCUSED AND CONTINUED TO DEMAND THAT THE REST OF THE ALCOHOL BE PAID, THE ACCUSED SUDDENLY PULLED THE VICTIM NON-INDICTED PARTY 1'S HAIR, THREW THE VICTIM NON-INDICTED PARTY 1 TO THE FLOOR, PUNCHED THE VICTIM NON-INDICTED PARTY 1 SEVERAL TIMES IN THE FACE, AND KICKED THE HEAD AND ABDOMEN OF THE VICTIM NON-INDICTED PARTY 1' HAVING FALLEN TO THE FLOOR SEVERAL TIMES AND STAMPED ON THE VICTIM NON-INDICTED PARTY 1 TO CAUSE THE VICTIM NON-INDICTED PARTY 1 TO FAINT. THE ACCUSED ASSAULTED THE VICTIM NON-INDICTED PARTY 2, WHO WAS STOPPING THE ACCUSED, SEVERAL TIMES WITH A FIST ON THE FACE AND HEAD. AS A RESULT, THE ACCUSED ASSAULTED THE VICTIMS AND MADE THE VICTIMS GIVE UP THE PAYMENT AND MADE AN UNFAIR PROPERTY PROFIT OF A TOTAL OF KRW 137,000, AND IN THE PROCESS, THE ACCUSED INFLICTED AN INJURY ON THE VICTIM NON-INDICTED PARTY 1 THAT REQUIRED TREATMENT FOR FOUR WEEKS, AND INFLICTED AN INJURY ON THE VICTIM NON-INDICTED PARTY 2 THAT REQUIRED TREATMENT FOR ABOUT THREE WEEKS. |

CRIME TYPE INFERENCE SYSTEM AND METHOD BASED ON TEXT DATA

CROSS-REFERENCE TO RELATED APPLICATION

This application claims priority to and the benefit of Korean Patent Applications Nos. 10-2021-0068365, filed on May 27, 2021, and 10-2022-0049513, filed on Apr. 21, 2022, the disclosures of which are incorporated herein by reference in its entirety.

BACKGROUND

1. Technical Field

The present disclosure relates to a crime type inference system and method based on text data.

2. Related Art

When a crime is reported, it is necessary to rapidly and effectively deal with the crime at the initial stage. For this operation, information on the type of the crime and the severity thereof needs to be provided to a field agent.

Most of public safety-related technologies according to the related art are focused on the prediction of crime occurrence, and PredPol of the U.S. is a representative example.

PredPol is a public safety service technology that predicts an occurrence of crime in the future, based on accumulated public safety statistical data, and prevents an occurrence of crime by reinforcing a patrol area (red box) or arranging manpower in advance, based on the prediction result.

However, new crimes may continuously occur due to various reasons that the prediction of the crime occurrence is impossible or fails. Thus, there is a need for a technology for rapidly and effectively dealing with a new crime.

SUMMARY

Various embodiments are directed to a crime type inference system and method based on text data, which can extract keywords by using text-based crime data (crime contents), and infer the type of the corresponding crime based on the extracted keywords.

In an embodiment, a crime type inference system based on text data, may include: a keywords dictionary construction unit configured to receive crime source data, and generate a crime type keywords dictionary by extracting crime keywords; a data set construction unit configured to generate a dataset for crime type learning by using the crime source data and the keywords dictionary; a crime type prediction model training unit configured to generate a crime type prediction model by using the dataset, and train the crime type prediction model; and a crime type inference unit configured to infer a crime type by using new crime data.

The crime source data may include text data related to a crime and a crime type true label.

The keywords dictionary construction unit may remove noise contained in the crime source data, perform morphological analysis, and group the morphological analysis results for each crime type.

The keywords dictionary construction unit may extract crime keywords by using a plurality of natural language analysis algorithms, and integrate the crime keywords extraction results.

The keywords dictionary construction unit may sort the crime keywords extraction results in order of evaluation scores, and construct the crime type keywords dictionary by using the sorting result.

The dataset construction unit may generate the dataset for crime type learning by using the keywords dictionary and the keywords for each case, extracted through the crime source data.

The dataset construction unit may match a one-hot encoded value for each crime type with the dataset for crime type learning.

The crime type prediction model training unit may train the crime type prediction model by comparing the one-hot encoded value to a machine learning output value.

The crime type inference unit may analyze the new crime data which is a report reception text, and provide an inference result including a probability value for the crime type.

In another embodiment, there is provided a crime type inference method based on text data, which is performed by a crime type inference system based on text data. The crime type inference method may include the steps of: (a) analyzing public safety data, and extracting keywords; (b) classifying the keywords for each crime type, and constructing a keywords dictionary; (c) constructing a crime type prediction model based on machine learning by using the keywords dictionary, and training the crime type prediction model; and (d) predicting a crime type by using new crime information.

The step (a) may include extracting the keywords by analyzing the public safety data including crime text data and crime type information.

The step (a) may include extracting the keywords by removing noise contained in the public safety data and performing morphological analysis.

The step (a) may include extracting the keywords by using a plurality of natural language analysis algorithms.

The step (b) may include sorting the results extracted by using the plurality of natural language analysis algorithms, and constructing the keywords dictionary.

The step (c) may include training the crime type prediction model by using a one-hot encoded value for each crime type.

The step (d) may include predicting a crime type by using the new crime information which is a report reception text, and providing a prediction result including a probability value for the crime type.

In still another embodiment, a crime type inference device based on text data may include: an input unit configured to receive crime source data; a memory configured to store a program for constructing a keywords dictionary by using the crime source data, and generating a crime type prediction model; and a processor configured to execute the program. The processor may generate the keywords dictionary by extracting keywords from the crime source data, and generate a dataset for crime type learning by using the crime source data and the keywords dictionary.

The processor may extract the keywords by using a plurality of difference natural language analysis algorithms, and generate the keywords dictionary by integrating the extracted keywords.

The processor may generate a dataset for crime type learning, which includes the keywords and one-hot encoded vector data.

The processor may provide a crime type prediction result including a crime type probability value by analyzing new crime information.

In accordance with the embodiments of the present disclosure, the crime type inference system and method may predict the type of a crime, and provide the prediction result to a field agent or a commanding officer, which makes it possible to rapidly and effectively establish a counterstrategy for a new crime at the early stage of reception of the crime, and to deal with the corresponding crime.

The effects of the present disclosure are not limited to the above-mentioned effects, and the other effects which are not mentioned herein will be clearly understood from the following descriptions by those skilled in the art.

DETAILED DESCRIPTION

The above-described object and other objects of the present disclosure, the advantages and characteristics of the present disclosure and a method for achieving the objects, advantages and characteristics will be clearly understood through embodiments to be described below in detail with reference to the accompanying drawings.

However, the present disclosure are not limited to the embodiments disclosed below, and may be embodied in various different forms. These embodiments are provided only to easily convey the object, configuration and effect of the present disclosure to those skilled in the art to which the present disclosure pertains. The scope of the present disclosure is only defined by the claims.

Terms used in this specification are used for describing embodiments, not limiting the present disclosure. The terms of a singular form used in this specification include plural forms unless specifically mentioned in sentences. The term such as "comprise" or "comprising" used in the specification specifies a component, step, operation and/or element, but does not exclude the presence or addition of one or more other components, steps, operations and/or elements.

A crime type inference system in accordance with an embodiment of the present disclosure infers the type of a new crime, and provides the inference result to policemen and detectives on the field. The crime type inference system in accordance with the embodiment of the present disclosure provides a public safety-connected service which is directly helpful for establishing an effective countermeasure for a new crime and establishing the course of investigation, thereby providing an AI (Artificial Intelligence) public safety service to protect the lives, bodies, and properties of people.

Figure 1:
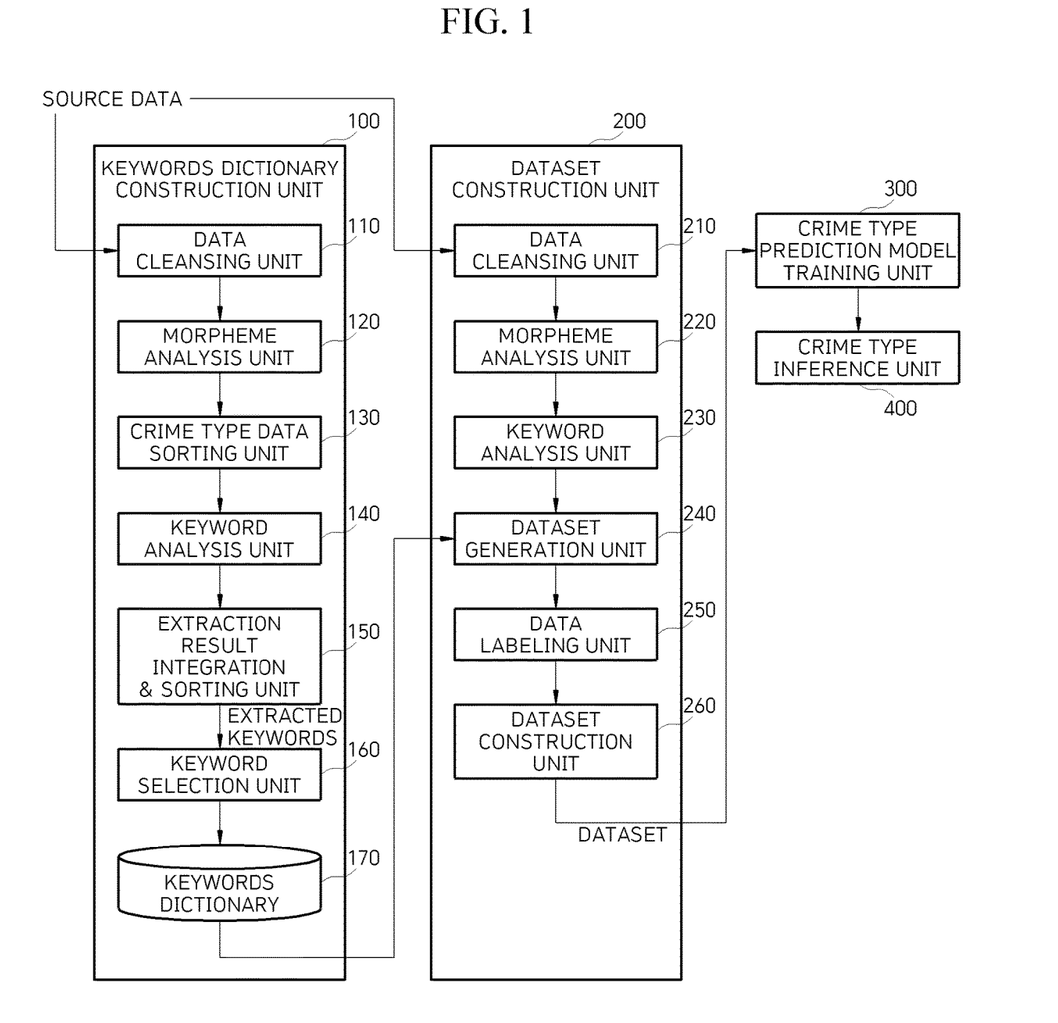
FIG. 1 is a diagram illustrating a crime type inference system based on text data in accordance with an embodiment of the present disclosure.

FIG. 1 is a diagram illustrating a crime type inference system based on text data in accordance with an embodiment of the present disclosure.

The crime type inference system based on text data in accordance with the embodiment of the present disclosure predicts a crime type by analyzing text data collected for crimes reported to the police. The prediction result is provided to a field agent, and the police initially responds to the reported case and arranges field agents.

In accordance with the embodiment of the present disclosure, the crime type inference system is implemented as a GUI-based software platform which supports field agents to easily use the corresponding inference result. In accordance with the present embodiment, the crime type inference system infers the type of a crime based on various public safety data and text-based investigation data, and provides the inference result to a field agent in real time.

Source data refers to data that is utilized for constructing a keywords dictionary and a crime type prediction model, and includes text data corresponding to a crime and crime type information on the text data. The crime type information is a ground truth for learning the text data of the crime, and corresponds to a true label.

A keywords dictionary construction unit 100 constructs the keywords dictionary by using text-based source data and a feature keywords extraction algorithm. A data set construction unit 200 generates a dataset for learning by using the source data and the keywords dictionary, and the dataset for learning includes feature keywords, risk information, and crime type information. A crime type prediction model training unit 300 generates a crime type prediction model based on deep learning through data learning. A crime type inference unit 400 is a GUI system that predicts a crime type based on criminal fact text data, and provides an inference result to a field agent or a commanding officer in real time. The crime type inference unit 400 receives new crime data, and provides a crime type inference result through inference.

The source data is investigation data which is inputted for each crime. A data cleansing unit 110 cleanses input source data, and removes noise which is not needed for keywords extraction or interferes with the keywords extraction.

A morpheme analysis unit 120 performs morphological analysis by using the cleansed data, and extracts a common noun NNG and a verb VV.

A crime type data sorting unit 130 receives the data extracted by the morpheme analysis unit 120, and groups the received data for each crime type in order to perform keyword analysis.

A keyword analysis unit 140 receives and analyzes the grouped information, extracts feature keywords, and transfers the extraction result to an extraction result integration and sorting unit 150.

The keyword analysis unit 140 in accordance with the embodiment of the present disclosure extracts a keyword by using a plurality of natural language analysis techniques. The keyword analysis unit 140 includes a first keyword analysis unit configured to utilize WordRank as a natural language processing analysis technique, and a second keyword analysis unit configured to utilize a TF-IDF (Term Frequency-Inverse Document Frequency) analysis algorithm, and transfers an analysis result to the extraction result integration and sorting unit 150.

The extraction result integration and sorting unit 150 integrates the keyword analysis results received from the first and second keyword analysis units. When integrating the keyword analysis results, the extraction result integration and sorting unit 150 checks the same keyword, and integrates the keyword analysis results by adding evaluation scores of the first and second keyword analysis units. The extraction result integration and sorting unit 150 sorts the extraction results in descending order of the evaluation score additions. A keyword selection unit 160 selects a preset number of keywords whose evaluation scores are high, for example, 20 keywords, for each crime type, and constructs a keywords dictionary 170 by using the selected keywords. The present number is changed according to the system implementation and management.

A data cleansing unit 210 cleanses the input source data as in the above-described keywords dictionary construction process.

A morpheme analysis unit 220 performs morpheme analysis by using the cleansed data.

A keyword analysis unit 230 extracts a keyword for each crime, and transfers the extracted result to a dataset generation unit 240.

The dataset generation unit 240 extracts a word included in the keywords dictionary 170 among the keyword analysis results, generates vector data according to a dataset form, and generates the entire dataset including the vector data.

A data labeling unit 250 receives a dataset, changes a crime type corresponding to the ground truth of the corresponding crime dataset into a one-hot vector, and matches the one-hot vector with the dataset.

The dataset generated on the basis of the case data becomes an input value of the crime type inference system, and a value obtained by one-hot encoding the crime type becomes an output value which is a label value.

Figure 2:
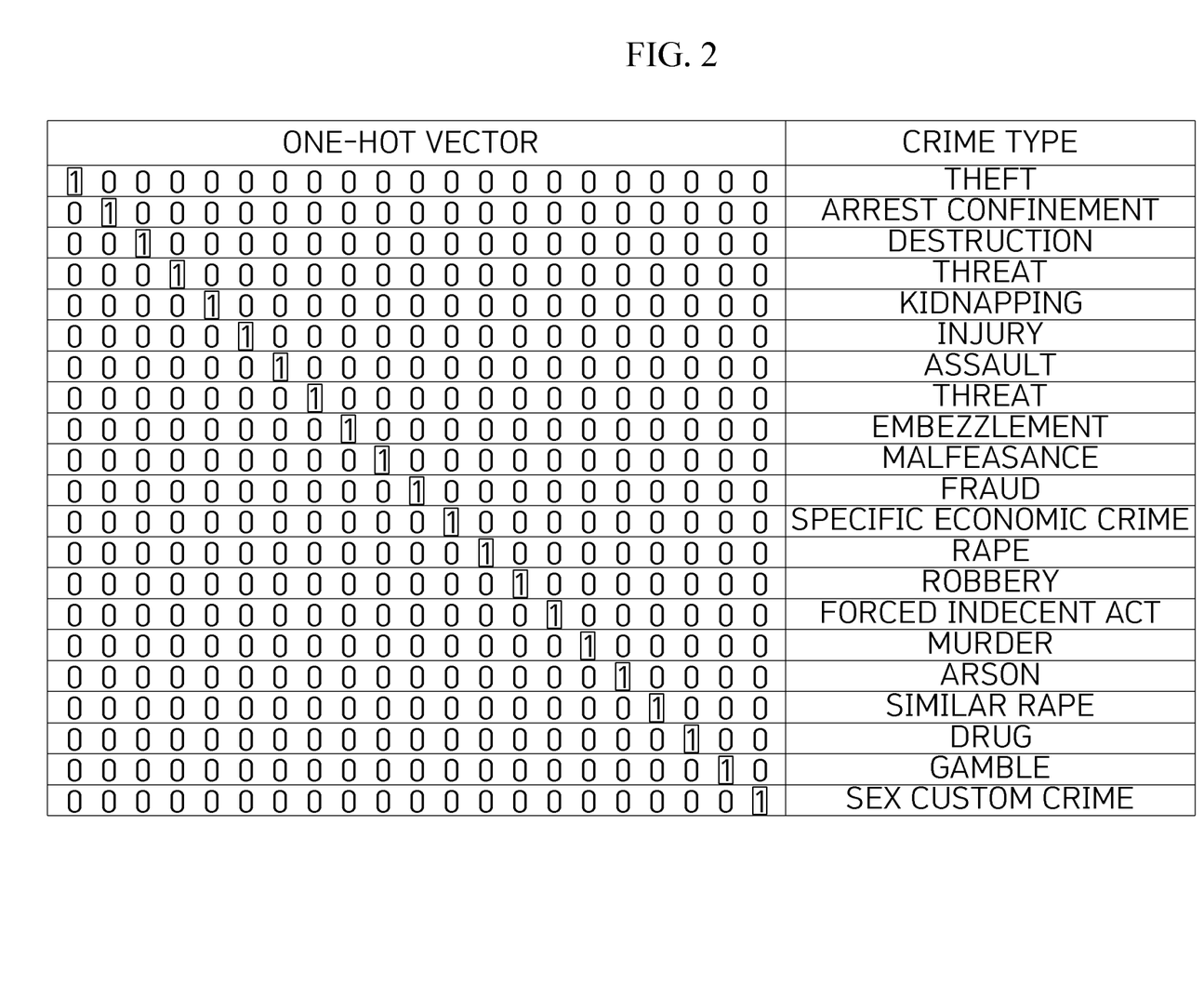
FIG. 2 is a table showing crime types encoded as one-hot vectors in accordance with the embodiment of the present disclosure.

FIG. 2 is a table showing crime types encoded as one-hot vectors in accordance with the embodiment of the present disclosure. Specifically, FIG. 2 shows results obtained by one-hot encoding 21 crime types based on middle classification.

Figure 3:
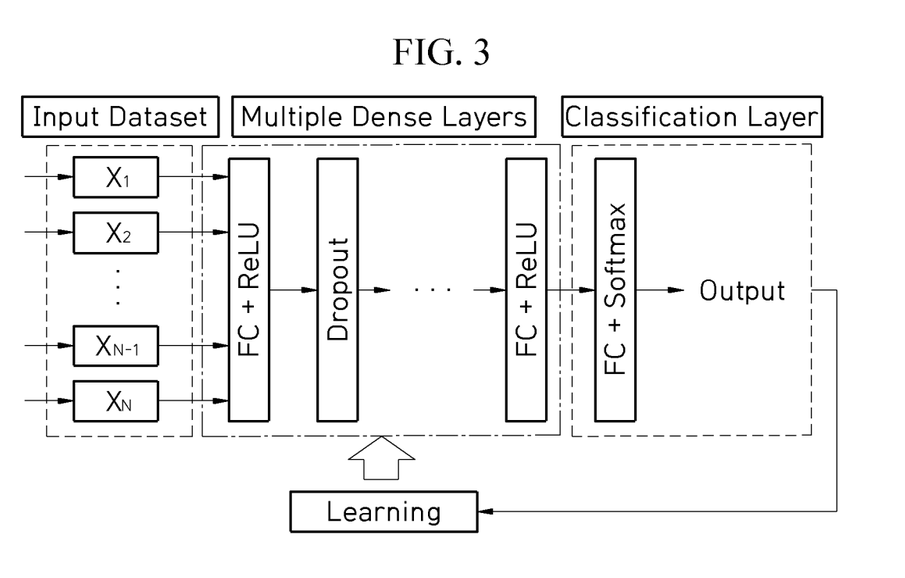
FIG. 3 is a diagram illustrating the configuration of a crime type prediction model in accordance with the embodiment of the present disclosure.

FIG. 3 is a diagram illustrating the configuration of a crime type prediction model in accordance with the embodiment of the present disclosure.

As illustrated in FIG. 3, the crime type prediction model includes a ReLU-based fully connected layer, a dropout layer, and an output layer.

The configurations of the corresponding layers may be changed according to the performance requirement and the complexity of the system. Input data is a value generated by the dataset generation unit 240, and an output value is generated after a machine learning process for the input value. During a training period, the crime type prediction model is trained through a process of reducing a difference between the output value and the ground truth by comparing an output value of machine learning and one-hot encoded ground truth. SGD (Stochastic Gradient Descent) which is a machine learning algorithm based on deep learning or various functions that play the same role as the SGD may be applied to the training. After preset training is completed during a specific period, the crime type prediction model may be installed and used in the real field.

Figure 4A:
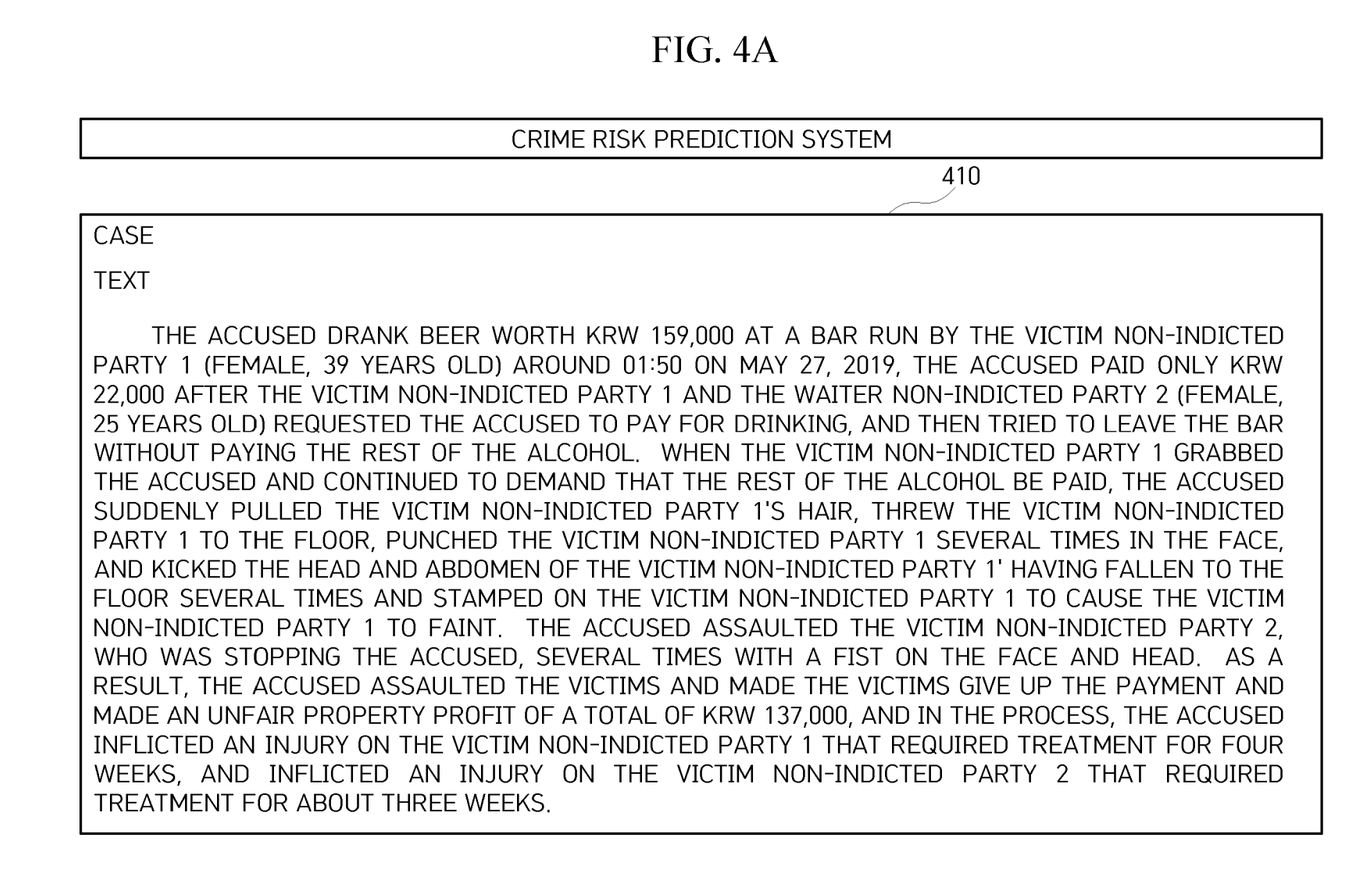
FIG. 4A to FIG. 4C are diagrams illustrating a real-time crime type inference platform in accordance with the embodiment of the present disclosure.
Figure 4B:
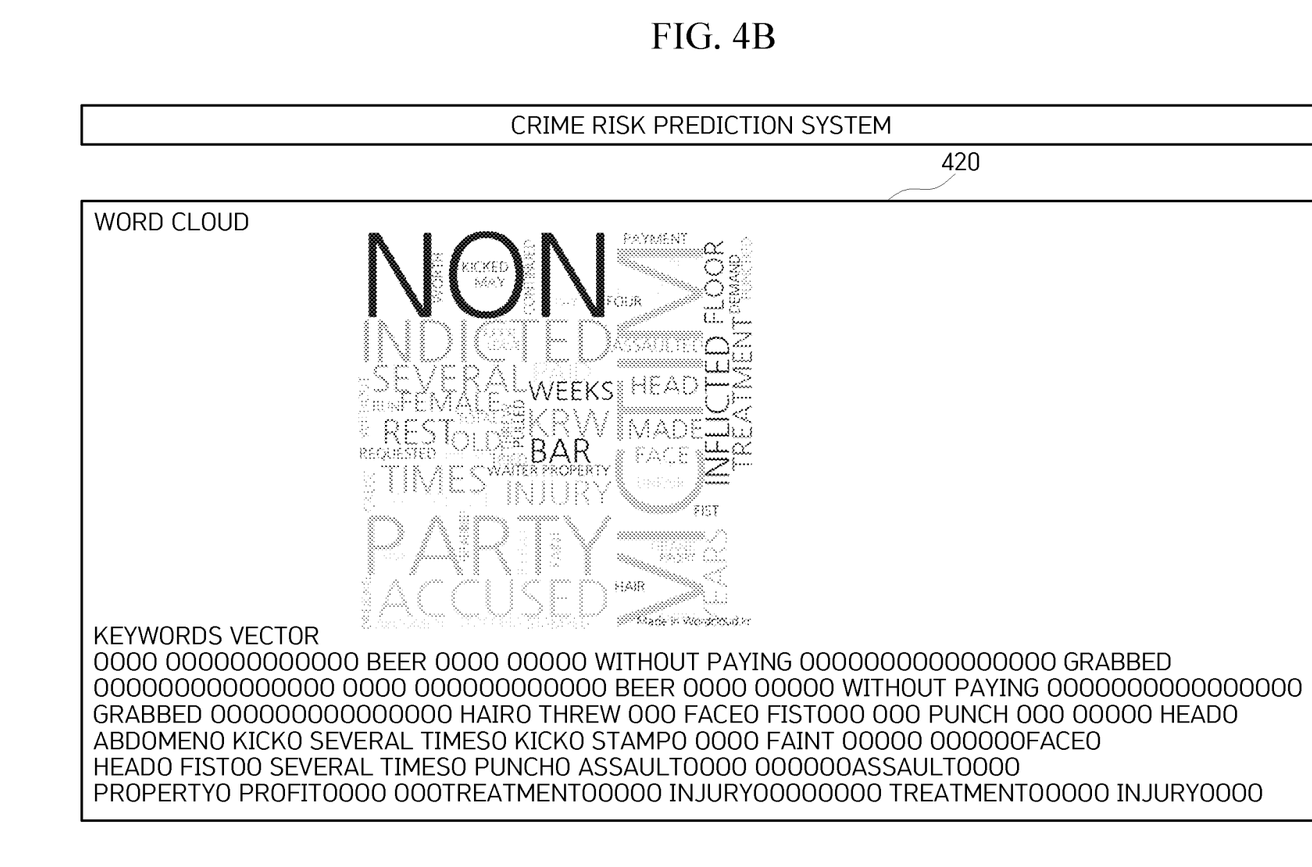
Figure 4C:
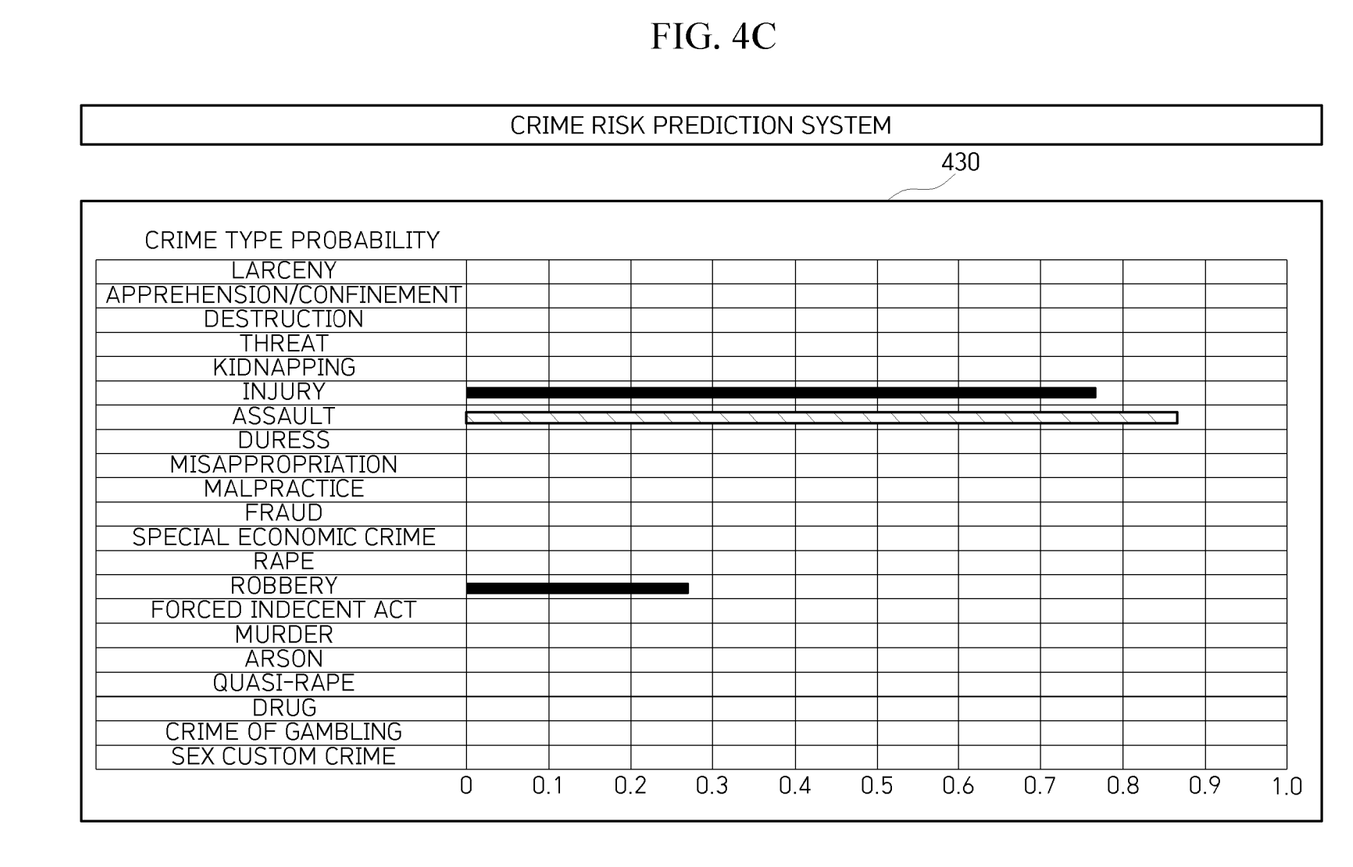

FIG. 4A through FIG. 4C are diagrams illustrating a real-time crime type inference platform in accordance with an embodiment of the present disclosure.

The real-time crime type inference platform in accordance with the embodiment of the present disclosure receives public safety data and text-based investigation data, analyzes the received data, extracts keywords perceived as important words, classifies the keywords for each crime type, and constructs a keywords dictionary for each crime type.

The real-time crime type inference platform in accordance with the embodiment of the present disclosure constructs a crime type prediction model based on machine learning by using the keywords dictionary, public safety data, and investigation data, and trains the corresponding model.

When a field agent inputs text-based crime contents in real time through an application system including a GUI, the real-time crime type inference platform infers and displays a crime type based on the corresponding contents.

In accordance with the embodiment of the present disclosure, when the investigation data or the public safety data is inputted through a terminal carried by a field agent, crime type information which is the inference result is provided as a probability value in the form of a bar graph. The screen arrangement and design of FIG. 4A through FIG. 4C may be changed in various manners.

Referring to FIG. 4A through FIG. 4C, text information is displayed in a first region 410, a word cloud and a keywords vector are displayed in a second region 420, and a crime type inference result is displayed in a third region 430.

In accordance with the embodiment of the present disclosure, a text may be received as an input value for crime type inference from a terminal of a reporter or a field agent, and a result obtained by converting voice information of the reporter or the field agent into a text may be received.

Figure 5:
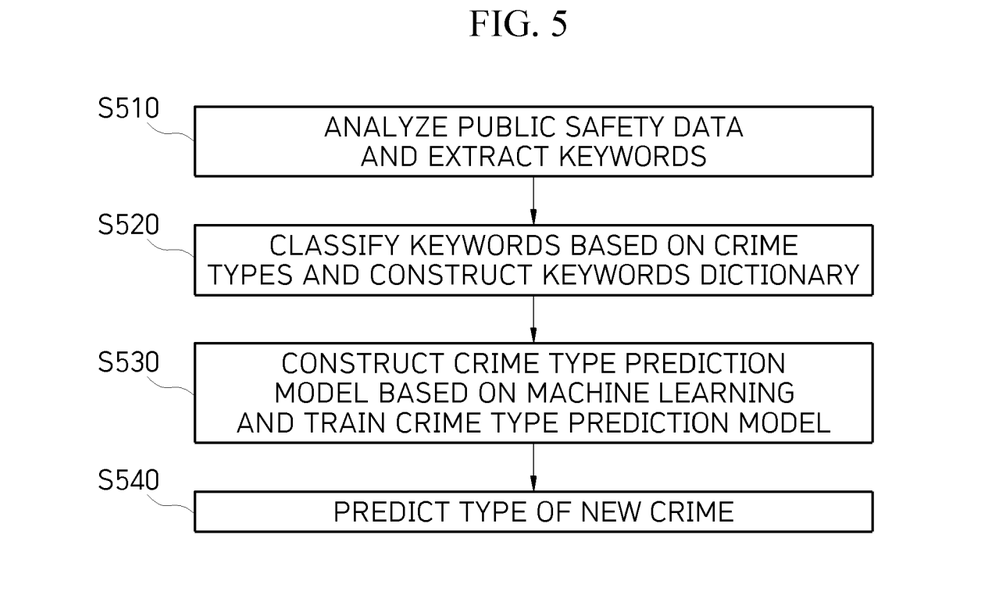
FIG. 5 is a flowchart illustrating a crime type inference method based on text data in accordance with an embodiment of the present disclosure.

FIG. 5 is a flowchart illustrating a crime type inference method based on text data in accordance with an embodiment of the present disclosure.

The crime type inference method based on text data in accordance with the embodiment of the present disclosure includes step S510 of analyzing public safety data and extracting keywords, step S520 of classifying the keywords based on crime types and constructing a keywords dictionary, step S530 of constructing a crime type prediction model based on machine learning and training the crime type prediction model, and step S540 of predicting the type of a new crime.

In step S510, the crime type inference system analyzes text data corresponding to a crime and crime type information (true label) on the text data, and extracts keywords. In step S510, the crime type inference system removes, from the input data, noise which is not necessary for keywords extraction, and extracts a common noun and a verb by performing morphological analysis. In step S510, the crime type inference system extracts the keywords by using a plurality of natural language analysis techniques. For example, the crime type inference system extracts the keywords by utilizing the WordRank and the TF-IDF analysis algorithm.

In step S520, the crime type inference system receives the keywords extraction result, integrates the results analyzed for the respective keyword analysis algorithms, and constructs a keywords dictionary.

In step S530, the crime type inference system cleanses source data and performs morphological analysis, and extracts keywords for each case. In step S530, the crime type inference system extracts a word, included in the keywords dictionary, from the keyword analysis result, generates vector data, and generates a dataset. In step S530, the crime type inference system changes the crime type to a one-hot vector, and matches the one-hot vector with the data set.

In step S540, when a field agent inputs text-based crime contents in real time through an application system including a GUI, the crime type inference system infers and displays a crime type according to the corresponding contents.

Figure 6:
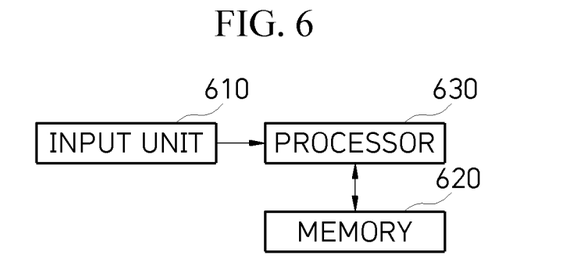
FIG. 6 is a diagram illustrating a crime type inference device based on text data in accordance with an embodiment of the present disclosure.

FIG. 6 is a diagram illustrating a crime type inference device based on text data in accordance with an embodiment of the present disclosure.

The crime type inference device based on text data in accordance with the embodiment of the present disclosure includes an input unit 610 configured to receive crime source data, a memory 620 configured to store a program that constructs a keywords dictionary by using the crime source data and generates a crime type prediction model, and a processor 630 configured to execute the program. The processor 630 generates a keywords dictionary by extracting keywords from the crime source data, and generates a dataset for crime type learning by using the crime source data and the keywords dictionary.

The processor 630 extracts the keywords by using a plurality of different natural language analysis algorithms, and generates the keywords dictionary by integrating the extracted keywords.

The processor 630 generates a dataset for crime type learning, which includes the keywords and one-hot encoded vector data.

The processor 630 analyzes new crime information, and provides a crime type prediction result including a crime type probability.

In accordance with another embodiment of the present disclosure, the crime type inference device constructs a dataset including crime type information and information corresponding to each crime type by analyzing public safety data, performs training, and provides a crime type inference result of a new crime and response manual information by analyzing new crime data. Through this process, field agents may receive response manual information on a new crime, and prepare means required for field action in advance.

In accordance with still another embodiment of the present disclosure, source data includes report context information and response information, and learning is performed on a response manual for each situation. Based on the learning result, a crime type inference result and response manual information are provided when a new crime is reported. For example, suppose that a reporter makes a call to the police and says "Please, deliver a pizza". If there is a record in which a report receiver did not determine that the call was a prank call, but understood that a victim reported a crime secretly while threatened by a criminal, and ordered a field agent to move to the scene in order to solve the corresponding case, the crime type inference device constructs a dataset including report context information and correspondence information for the report, constructs a crime response model, and trains the crime response model.

Thus, when keywords of a new crime report text reported by a reporter include "deliver" and the location of the reporter is a motel, the crime type inference device infers the type of the new crime such as confinement and dating violence, and provides the inference result and response manual information. For example, the response manual information says that "A field agent needs to disguise himself as a pizza delivery man and enter the motel.", "Since the location of a reporter who reported a crime as if the reporter ordered a delivery is room 201 of AA motel, and a suspect can escape using an outer gas pipe line outside a window of the location, a field agent needs to block the escape route", and "The location of a reporter who reported a crime as if the reporter ordered a delivery is room 801 of BB motel, and an air mat needs to be installed in order to prepare for the case in which a victim escapes through a window of the location."

The method in accordance with the embodiment of the present disclosure may be implemented in a computer system or recorded in a recording medium. The computer system may include one or more processors, a memory, a user input device, a data communication bus, a user output device and a storage place. The above-described components perform data communication through a data communication bus.

The computer system may further include a network interface coupled to a network. The processor may be a CPU (Central Processing Unit), or a semiconductor device configured to process a command stored in the memory and/or the storage place.

The memory and the storage place may include various types of volatile or nonvolatile storage media. For example, the memory may include a ROM and RAM.

Therefore, the method in accordance with the embodiment of the present disclosure may be implemented as a method which can be executed in a computer. When the method in accordance with the embodiment of the present disclosure is executed by a computer device, computer readable commands may perform the method in accordance with the present disclosure.

The method in accordance with the embodiment of the present disclosure may be implemented as computer readable codes in a computer readable recording medium. The computer readable recording medium includes all types of recording media storing data which can be read by a computer system. Examples of the computer readable recording media may include a ROM, RAM, magnetic tape, magnetic disk, flash memory, optical data storage device and the like. Furthermore, the computer readable recording media are may be stored and executed as codes which are distributed to computer systems connected through a computer communication network and read in a distributed manner.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A crime type inference system based on text data, comprising:
    a keywords dictionary construction unit configured to receive crime source data, and generate a crime type keywords dictionary by extracting crime keywords;
    a data set construction unit configured to generate a dataset for crime type learning by using the crime source data and the keywords dictionary;
    a crime type prediction model training unit configured to generate a crime type prediction model by using the dataset, and train the crime type prediction model; and
    a crime type inference unit configured to infer a crime type by using new crime data;
    wherein the crime type inference unit analyzes the new crime data which is a report reception text, and provides an inference result including a probability value for the crime type.

2. The crime type inference system of claim 1, wherein the crime source data comprises text data related to a crime and a crime type true label.

3. The crime type inference system of claim 1, wherein the keywords dictionary construction unit removes noise contained in the crime source data, performs morphological analysis, and groups the morphological analysis results for each crime type.

4. The crime type inference system of claim 1, wherein the keywords dictionary construction unit extracts crime keywords by using a plurality of natural language analysis algorithms, and integrates the crime keywords extraction results.

5. The crime type inference system of claim 4, wherein the keywords dictionary construction unit sorts the crime keywords extraction results in order of evaluation scores, and constructs the crime type keywords dictionary by using the sorting result.

6. The crime type inference system of claim 1, wherein the dataset construction unit generates the dataset for crime type learning by using the keywords dictionary and the keywords for each case, extracted through the crime source data.

7. The crime type inference system of claim 6, wherein the dataset construction unit matches a one-hot encoded value for each crime type with the dataset for crime type learning.

8. The crime type inference system of claim 7, wherein the crime type prediction model training unit trains the crime type prediction model by comparing the one-hot encoded value to a machine learning output value.

9. A crime type inference method based on text data, which is performed by a crime type inference system based on text data, the crime type inference method comprising the steps of:

(a) analyzing public safety data, and extracting keywords;
(b) classifying the keywords for each crime type, and constructing a keywords dictionary;
(c) constructing a crime type prediction model based on machine learning by using the keywords dictionary, and training the crime type prediction model; and
(d) predicting a crime type by using new crime information;

wherein the step (a) comprises extracting the keywords by analyzing the public safety data including crime text data and crime type information.

10. The crime type inference method of claim 9, wherein the step (a) further comprises extracting the keywords by removing noise contained in the public safety data and performing morphological analysis.

11. The crime type inference method of claim 9, wherein the step (a) further comprises extracting the keywords by using a plurality of natural language analysis algorithms.

12. The crime type inference method of claim 11, wherein the step (b) comprises sorting the results extracted by using the plurality of natural language analysis algorithms, and constructing the keywords dictionary.

13. The crime type inference method of claim 9, wherein the step (c) comprises training the crime type prediction model by using a one-hot encoded value for each crime type.

14. The crime type inference method of claim 9, wherein the step (d) comprises predicting a crime type by using the new crime information which is a report reception text, and providing a prediction result including a probability value for the crime type.

15. A crime type inference device based on text data, comprising:
an input unit configured to receive crime source data;
a memory configured to store a program for constructing a keywords dictionary by using the crime source data, and generating a crime type prediction model; and
a processor configured to execute the program,
wherein the processor generates the keywords dictionary by extracting keywords from the crime source data, and generates a dataset for crime type learning by using the crime source data and the keywords dictionary; and
wherein the processor provides a crime type prediction result including a crime type probability value by analyzing new crime information.

16. The crime type inference device of claim 15, wherein the processor extracts the keywords by using a plurality of difference natural language analysis algorithms, and generates the keywords dictionary by integrating the extracted keywords.

17. The crime type inference device of claim 15, wherein the processor generates a dataset for crime type learning, which includes the keywords and one-hot encoded vector data.

* * * * *